United States Patent
Jacobs et al.

(10) Patent No.: US 12,021,485 B2
(45) Date of Patent: Jun. 25, 2024

(54) INSERTION RAIL FOR A SOLAR MODULE MOUNTING SYSTEM

(71) Applicant: KLOECKNER METALS CORPORATION, Roswell, GA (US)

(72) Inventors: Jeremy Jacobs, Sacramento, CA (US); Mark Schroeder, Rancho Cordova, CA (US); Brooke Stubben, Fair Oaks, CA (US)

(73) Assignee: KLOECKNER METALS CORPORATION, Roswell, GA (US)

(*) Notice: Subject to any disclaimer, the term of this patent is extended or adjusted under 35 U.S.C. 154(b) by 159 days.

(21) Appl. No.: 17/229,665

(22) Filed: Apr. 13, 2021

(65) Prior Publication Data
US 2021/0320620 A1 Oct. 14, 2021

Related U.S. Application Data

(60) Provisional application No. 63/009,207, filed on Apr. 13, 2020.

(51) Int. Cl.
*H02S 30/10* (2014.01)
*F16B 5/12* (2006.01)
*F24S 25/33* (2018.01)

(52) U.S. Cl.
CPC .............. *H02S 30/10* (2014.12); *F16B 5/121* (2013.01); *F24S 25/33* (2018.05)

(58) Field of Classification Search
CPC .......... H02S 20/23; H02S 20/00; H02S 30/10; F24S 25/35; F24S 25/632; F24S 25/65; F24S 25/33; F24S 2025/801; F24S 2025/803; Y02B 10/10; Y02E 10/47; Y02E 10/50; F16B 5/121
See application file for complete search history.

(56) References Cited

U.S. PATENT DOCUMENTS

| | | | |
|---|---|---|---|
| 7,252,083 B2 | 8/2007 | Hayden | |
| 7,254,925 B2 | 8/2007 | Stefanutti et al. | |
| 7,531,741 B1 | 5/2009 | Melton et al. | |
| 7,866,099 B2 * | 1/2011 | Komamine | H02S 20/00 52/173.3 |
| 8,118,181 B2 | 2/2012 | Shinozaki | |
| 8,136,311 B2 | 3/2012 | Liu | |
| 8,216,407 B2 | 7/2012 | Kalkanoglu et al. | |

(Continued)

FOREIGN PATENT DOCUMENTS

DE 102019108036 A1 * 10/2020 ............. E04F 10/08
FR 3124335 A1 * 12/2022

*Primary Examiner* — Patrick D Hawn
(74) *Attorney, Agent, or Firm* — Troutman Pepper Hamilton Sanders LLP; James E. Schutz; Matthew J. Esserman (57) ABSTRACT

An insertion rail for a solar panel mounting system is provided. The insertion rail has a mounting wall configured for connection to the solar panel mounting system, wherein the mounting wall is posited at a lower end of a first side of the insertion rail, a vertical leg coupled to the mounting wall at at least one location, wherein the vertical leg is positioned at a second side of the insertion rail, and at least one mating section located at an upper end of the insertion rail. The mating section has an upper tab, a lower tab and the upper tab and lower tab are configured to receive and secure a solar panel integrally therewith using an interference fit.

16 Claims, 6 Drawing Sheets

(56) References Cited

U.S. PATENT DOCUMENTS

| | | | |
|---|---|---|---|
| 8,365,479 B2 | 2/2013 | Tucker | |
| 8,371,076 B2 | 2/2013 | Jones et al. | |
| 8,371,088 B2 | 2/2013 | Merrifield | |
| 8,424,821 B2 | 4/2013 | Liu | |
| 8,595,996 B2 * | 12/2013 | Korman | H02S 30/10 |
| | | | 52/173.3 |
| 8,661,747 B2 * | 3/2014 | Eide | F24S 25/12 |
| | | | 126/621 |
| 8,707,631 B2 | 4/2014 | Scouten | |
| 9,166,526 B2 * | 10/2015 | Durney | F16M 11/00 |
| 10,594,250 B2 * | 3/2020 | Schuit | H02S 20/23 |
| 11,489,481 B2 * | 11/2022 | Schuit | F24S 25/67 |
| 2004/0163338 A1 * | 8/2004 | Liebendorfer | H02S 20/23 |
| | | | 52/173.3 |
| 2008/0264467 A1 | 10/2008 | Doko | |
| 2009/0050194 A1 | 2/2009 | Noble | |
| 2009/0320898 A1 | 12/2009 | Gumm | |
| 2013/0333310 A1 | 12/2013 | Damo | |
| 2014/0008312 A1 * | 1/2014 | Durney | H02S 20/10 |
| | | | 211/26 |
| 2017/0040928 A1 * | 2/2017 | Schuit | F24S 25/632 |

\* cited by examiner

INSERTION RAIL FOR A SOLAR MODULE MOUNTING SYSTEM

CROSS-REFERENCE TO RELATED APPLICATION

This application claims the benefit of U.S. Provisional Application Ser. No. 63/009,207 entitled Insertion Rail for a Solar Module Mounting System filed on Apr. 13, 2020, the entire contents of which are incorporated herein by reference for all purposes.

FIELD OF THE INVENTION

The present invention generally relates to a mounting system for solar panels. More specifically, the present invention relates to an insertion rail for a solar panel mounting system used for simplifying mounting solar panels while also minimizing fasteners, and in turn, minimizing the installation cost of the entire mounting system.

BACKGROUND

Photovoltaic (or solar) electric systems are the most environmentally friendly way of generating electricity. Typical solar electric systems comprise solar panels and a plurality of solar modules coupled together. Photovoltaic mounting systems (also called solar module racking systems) are used to fix solar panels on surfaces like roofs, building facades, or the ground. These mounting systems generally enable retrofitting of solar panels on roofs or as part of the structure of the building, or are fixed to the ground.

Existing mounting systems are often overly complicated and difficult to install and manufacture because they use thousands or even millions of fasteners (such as bolts and screws). In addition, the conventional mounting systems are expensive and time consuming to install the solar panels when a large, high megawatt job needs to be installed. Indeed, conventional mounting systems use various types of fasteners and installation mechanisms, which require multiple tools and technicians, thus resulting an increase in installation cost.

Therefore, there is a need for a mounting system to simplify mounting solar panels using minimum fasteners, thus minimizing the installation cost. Further, there is a need for a mounting system for providing greater freedom of mounting positions.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

To achieve the foregoing and other aspects and in accordance with the purpose of the invention, an insertion rail for a solar mounting system is provided.

The insertion rail described herein is rail that is flexible and is able to receive solar panels having different sizes.

The present invention discloses a mounting system with an insertion rail. In one embodiment, the insertion rail is configured to slidably receive and secure solar panels on both sides of the rail (e.g., east/west) via a friction fit without the need for any additional mounting hardware. In one embodiment, the insertion rail is further configured to securely connect to the solar panel mounting system using one or more fasteners, for example, threaded bolts towards a lower portion of the rail. In one embodiment, the solar panel mounting system comprises a frame, wherein the frame comprises a plurality of mounting brackets.

In one embodiment, the insertion rail is configured to slidably receive and frictionally secure the solar panels on both sides of the rail using a frictional fit to thereby eliminate approximately 600,000 bolts and nuts per 100 megawatts (MW). In one embodiment, the insertion rail is secured to the horizontal support member of the frame on both sides via the mounting brackets using one or more fasteners. The insertion rail is further configured to provide at least two channels at a top portion and a bottom portion thereof, thereby further providing aesthetic and thermal benefits.

In one embodiment, the insertion rail comprises a first vertical element, a second vertical element, and a clamp member. The first vertical element has a base at a bottom portion and the second vertical element is vertically extended from the base of the first vertical element. The second vertical element and the first vertical element are spaced from each other via a divider. The clamp member comprises a pair of guide rails on both sides and is securely affixed to a top portion of the first vertical element and the second vertical member. In one embodiment, the pair of guide rails on both sides are configured to slidably receive and frictionally secure the solar panels, thereby simply mounting the solar panels using the insertion rail with the solar panel mounting system.

In one embodiment, the first vertical element further comprises one or more holes configured to threadedly receive fasteners, for example, threaded bolts, for securely connecting the insertion rail to the mounting bracket of the frame. In one embodiment, a length of each insertion rail is approximately equal to a length of the solar panel. In one embodiment, the insertion rail is further configured to slidably receive and frictionally secure the solar panels of thicknesses ranges from about, but not limited to, 35 to 40 mm. In one embodiment, the insertion rail may be made of a material including but not limited to aluminum.

In another embodiment, the insertion rail is configured to slidably receive and frictionally secure the solar panels on both sides via a friction fit or frictional engagement, through other types of fits may be used. The insertion rail is further configured to securely connect to the solar panel mounting system using one or more fasteners, for example, threaded bolts. The insertion rail comprises a base at a bottom portion and a wall vertically extended from one end of the base and further comprises a pair of guide rails on both sides of the wall. The pair of guide rails on both sides are configured to slidably receive and frictionally secure the solar panels, thereby simply mounting the solar panels using the insertion rail with the solar panel mounting system. In another embodiment, the insertion rail further comprises protrusions on both sides at the guide rail portion. In one embodiment, the protrusions on both sides of the insertion rail provides the channels on both sides at the guide rail portion, thereby providing further aesthetic and thermal benefits.

In an embodiment, an insertion rail for a solar panel mounting system is provided. The insertion rail has a mounting wall configured for connection to the solar panel mounting system, wherein the mounting wall is posited at a lower end of a first side of the insertion rail, a vertical leg coupled to the mounting wall at at least one location, wherein the vertical leg is positioned at a second side of the insertion rail, and at least one mating section located at an upper end of the insertion rail. The mating section has an upper tab, a lower tab and the upper tab and lower tab are configured to receive and secure a solar panel integrally therewith using an interference fit.

In an embodiment, a solar panel mounting system is provide having a frame configured to support at least one solar panel, a plurality of mounting brackets connected to the frame, and plurality of support brackets connected to the frame, and an insertion rail comprising a mounting wall configured for connection to the solar panel mounting system, wherein the mounting wall is posited at a lower end of a first side of the insertion rail, a vertical leg coupled to the mounting wall at at least one location, wherein the vertical leg is positioned at a second side of the insertion rail, at least one mating section located at an upper end of the insertion rail, wherein the mating section comprises an upper tab, a lower tab, wherein the upper tab and lower tab are configured to receive and secure a solar panel integrally therewith using an interference fit.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

Other features, advantages, and aspects of the present invention will become more apparent and be more readily understood from the following detailed description, which should be read in conjunction with the accompanying drawings.

DETAILED DESCRIPTION OF THE INVENTION

The present invention is best understood by reference to the detailed figures and description set forth herein.

Embodiments of the invention are discussed below with reference to the examples. However, those skilled in the art will readily appreciate that the detailed description given herein with respect to these examples is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
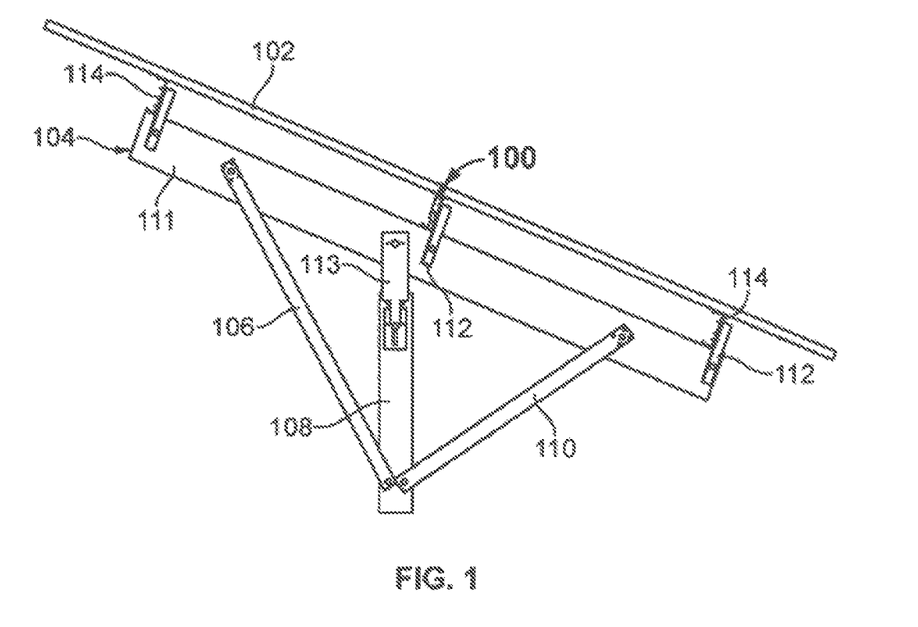
FIG. 1 illustrates a side view of solar mounting system having an insertion rail for a solar panel mounting system according to an embodiment of the present invention.

Referring to FIG. 1, a solar mounting system having an insertion rail 100 for a solar panel mounting system is disclosed. In one embodiment, the insertion rail 100 is configured to slidably receive and secure solar panels 102 on both sides of the rail (e.g., east/west or side to side) via a friction fit without the need for any additional mounting hardware. In one embodiment, the insertion rail 100 is further configured to securely connect to the solar panel mounting system using one or more fasteners, for example, threaded bolts (shown in greater detail with relation to FIG. 2). In one embodiment, the solar panel mounting system comprises a frame 104, and the frame 104 comprises a plurality of mounting brackets 112 and support brackets 114. In one embodiment, the insertion rail 100 eliminates approximately twenty-five percent (25%) of the east-west beams in the solar panel mounting system. This reduces the mounting bolt count to two fasteners per module, substantially reducing installation costs and increasing the speed.

The racking system in which the insertion rail 100 is integral comprises a plurality of mounting and support members, including but not limited to vertical mounting members 108, horizontal support members 111 and diagonal support members 106 and 110. In one embodiment, one end of the support members 106 and 110 are pivotally connected to the horizontal supporting members 111, while and other ends are secured to the vertical mounting member 108. The vertical mounting members 108 and the support members 106 and 110 are pivotally connected to the horizontal supporting members 111 and configured to adjust and align the solar panels 102 at the correct or optimized angle. In one embodiment, one end of the vertical mounting members 108 are pivotally connected to the horizontal supporting member 111 via a bracket 113. The horizontal support members 111 support the solar panels 102 together with the insertion rail 100 and support brackets 114. The insertion rail 100 and supporting brackets 114 are securely connected to the horizontal supporting members 111 on both sides via mounting brackets 112.

Figure 2:
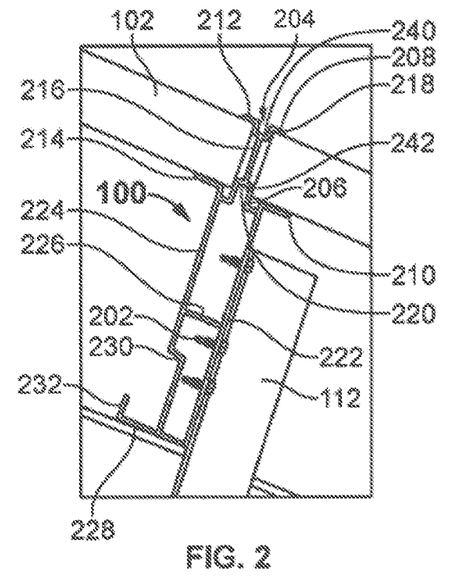
FIG. 2 illustrates an enlarged view of the insertion rail according to one embodiment of the present invention.

Referring now to FIG. 2, an enlarged view of the insertion rail 100 according to one embodiment of the present invention is shown. The insertion rail 100 is configured to receive and secure the solar panels 102 and is further configured to slidably receive and frictionally secure the solar panels 102 on both sides using a frictional fit or engagement thereby eliminating approximately 600,000 bolts and nuts per 100 MW. In one embodiment, the insertion rail 100 is secured to the horizontal supporting member 111 of the frame 104 on both sides via the mounting brackets 112 using one or more fasteners 202. In one embodiment, the insertion rail 100 further comprises one or more upper and lower channels 204 and 206 respectively at a top portion and a bottom portion, thereby providing aesthetic and thermal benefits due to the spacing provided by the channels 204 and 206. The channels are on an upper channel located at the upper end of the insertion rail 100 and are formed by a top and bottom U-shaped member (240 and 242) that connects the right tabs 208 and 210, left tabs 212 and 214, and the center spine 216.

Referring still to FIG. 2, the rail 100 further comprises a right mating section comprising right upper tab 208 and right lower tab 210, and a left mating section comprising left upper tab 212 and left lower tab 214. These mating sections provide a friction fit (also known as interference fit or press fit) and fasten the consecutive solar panels 102 or modules to form a joint (or "guide rail") which is held together by friction after the parts are pushed together. The rail 100 further comprises a center spine 216 integrated vertically between the top joint 218 and bottom joint 220. The spine 218 is configured to provide structural integrity to the rail 100.

The insertion rail 100 further comprises a mounting wall 222 on its right side, and a vertical leg 224 on its left side (as used herein "left" and "right" may mean "one side" and "the other side" as the elements are interchangeable from one side to the other). The mounting wall 222 may comprise a plurality of mounting holes to connect the rail 100 to the mounting bracket 112. In other embodiments, the mounting wall 222 may not have mounting holes and may be drilled through on site so that the fasteners 202 connect the rail 100 to the mounting system.

The vertical leg 224, which is positioned on the other side of rail 100 relative to the mounting wall 222, comprises an inward angle 230 positioned on a downward end of the vertical leg 224 before bending into a cleat 228, and further bending upwardly into a hook 232. A center rib 226 connects the mounting wall to the vertical leg 224 to provide additional support. In embodiments, the cleat 228 mates or rests on the frame 104.

Figure 3:
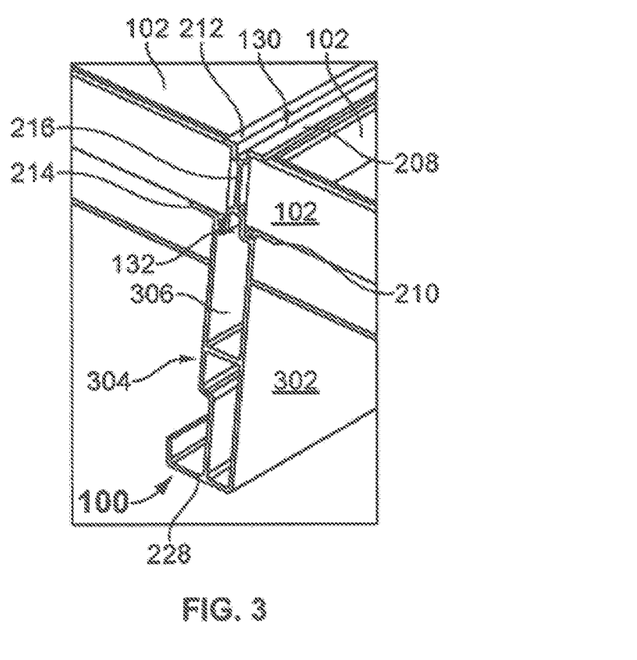
FIG. 3 illustrates an enlarged perspective view of the insertion rail according to one embodiment of the present invention.

Referring now to FIG. 3, an enlarged perspective view of the insertion rail or FIG. 2 is shown. As with FIGS. 1 and 2, the insertion rail 100 is configured to receive and secure the solar panels 102 and is further configured to slidably receive and frictionally secure the solar panels 102 on both sides using a friction fit. In one embodiment, the insertion rail 100 is secured to the horizontal supporting member 111 of the frame 104 on both sides via the mounting brackets 112 using one or more fasteners 202. In this view, the right side 302 of the insertion rail 100 is shown. Further, in this view, the right upper tab 208 and right lower tab 210 can be seen forming the mating joint with the solar panels 102. The center spine 216 that integrated vertically between the top joint 218 and bottom joint 220 can also be seen. The spine 216 is configured to provide structural integrity to the rail 100. Left side 304 is shown by the reference arrow but is not visible.

Figure 4:
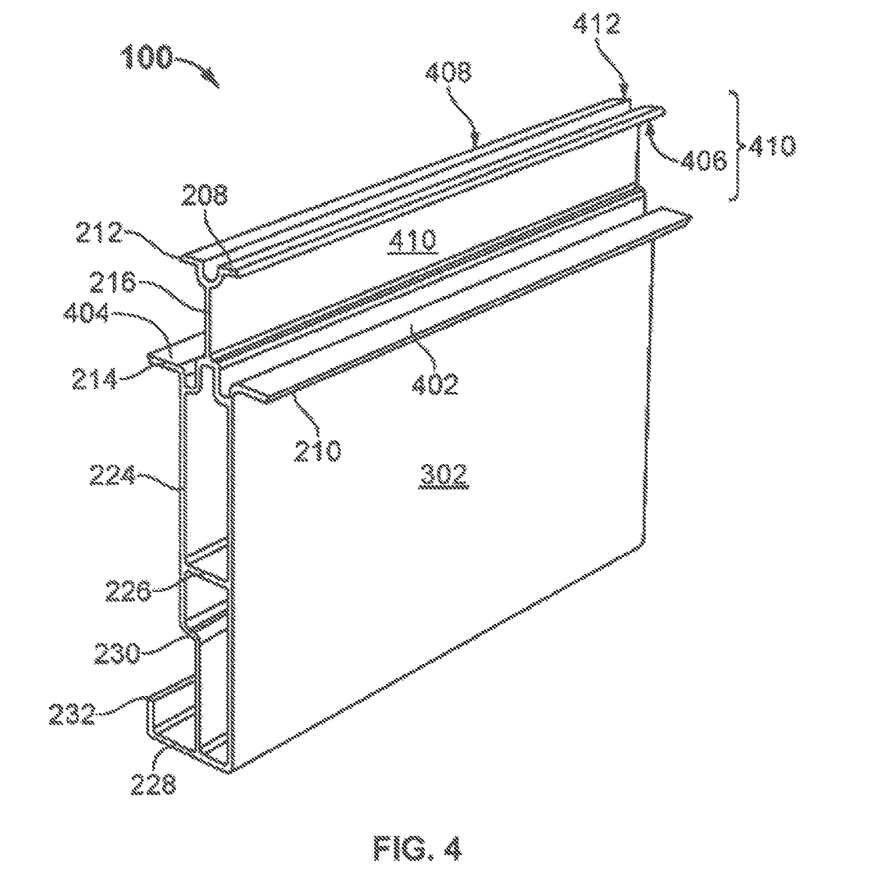
FIG. 4 illustrates a perspective view of the insertion rail, according to one embodiment of the present invention.

Referring now to FIG. 4, an enlarged top perspective view of the insertion rail of FIG. 2 and FIG. 3 is shown, but in this embodiment, without the solar panels 102 connected thereto via the interference fit. As with FIG. 3, the insertion rail 100 is configured to receive and secure the solar panels 102 and is further configured to slidably receive and frictionally secure the solar panels 102 on both sides of the joint using a friction fit. In this view, the right side 302 of the insertion rail 100 is shown, and the depth of the rail is shown. The right upper tab 208 and right lower tab 210 can be seen forming the mating joint, and further comprises a right lower mating surface 402, lower left mating surface 404, upper right mating surface 406, and upper left mating surface 408. These mating surfaces form guide rails 410 and 412. In this way, as can be seen, the rail is configured as a purlin.

In one embodiment, the joint, which formed by the tabs 208, 210, 212 and 214 is flexible to receive the solar panels 102 of various thicknesses. Electrical bonding is maintained from the solar panels 102 to the solar panel mounting system at the top and bottom of attachment points via north and south purlins 114 of the vertical mounting members 108, the horizontal supporting members 111, and the support members 106 and 110. In one embodiment, the solar panels 102 may snap into pair of joints (or guide rails) 410 and 412 on both sides of the insertion rail 100 by a person or a technician. In one embodiment, the clamp (tabs plus guide rails) or rail 100 as a whole may be formed from, but not limited to, an aluminum extrusion and 6061 or 6063 mill-finish aluminum alloy.

In one embodiment, the first vertical element 118 further comprises one or more holes configured to threadedly receive fasteners 202 (shown in FIG. 2), for example, threaded bolts, for securely affixing the insertion rail 100 to the mounting bracket 112 (shown in FIG. 1) of the frame 104 (shown in FIG. 1). In one embodiment, a length of each insertion rail 100 is approximately equal to a length of the solar panel 102. In one embodiment, the insertion rail 100 is further configured to slidably receive and frictionally secure the solar panels 102 of thicknesses ranges from about, but not limited to, 35 to 40 mm. In one embodiment, the insertion rail 100 is made of, but not limited to, aluminum.

Figure 5:
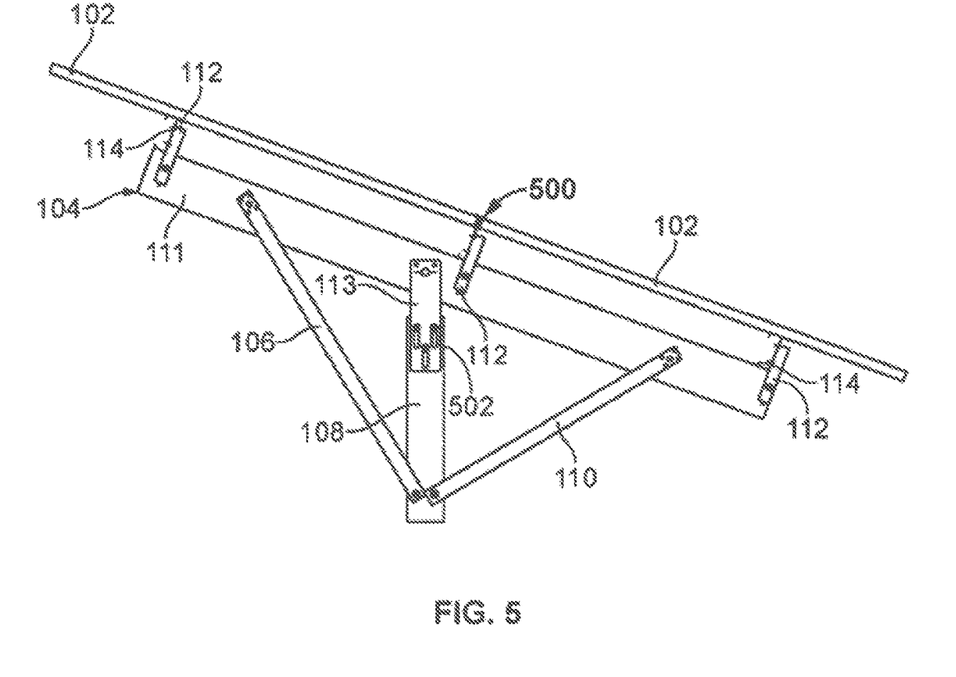
FIG. 5 illustrates another side view of an insertion rail for a solar panel mounting system according to another embodiment of the present invention.

Referring now to FIG. 5, the insertion rail 500 for a solar panel mounting system in another embodiment is disclosed. In another embodiment, the insertion rail is configured to slidably receive and frictionally secure the solar panels 102 on both sides via a frictional fit or frictional engagement. In one embodiment, the insertion rail is further configured to securely affix to the solar panel mounting system using one or more fasteners, for example, threaded bolts. In one embodiment, the solar panel mounting system having a frame 104. Like in FIG. 1, the frame 104 comprises a plurality of mounting brackets comprising vertical mounting members 108, horizontal supporting members 111, and support members 106 and 110. In one embodiment, one end of the support members 106 and 110 are pivotally connected to the horizontal supporting members 111 and other ends are secured to the vertical mounting member 108. In one embodiment, one ends of the vertical mounting members 108 are pivotally connected to the horizontal supporting member 111 via a bracket 113. In one embodiment, the horizontal supporting members 111 supports the solar panels 102 via the insertion rail 500 and supporting brackets 114 (or north/south purlins). In one embodiment, the insertion rail 500 and supporting brackets 114 are securely affixed to the horizontal supporting members 111 on both sides via mounting brackets 112. However, in this embodiment, the bracket 113 is attached to the mounting member 108 via a series of lower fasteners 502.

Figure 6:
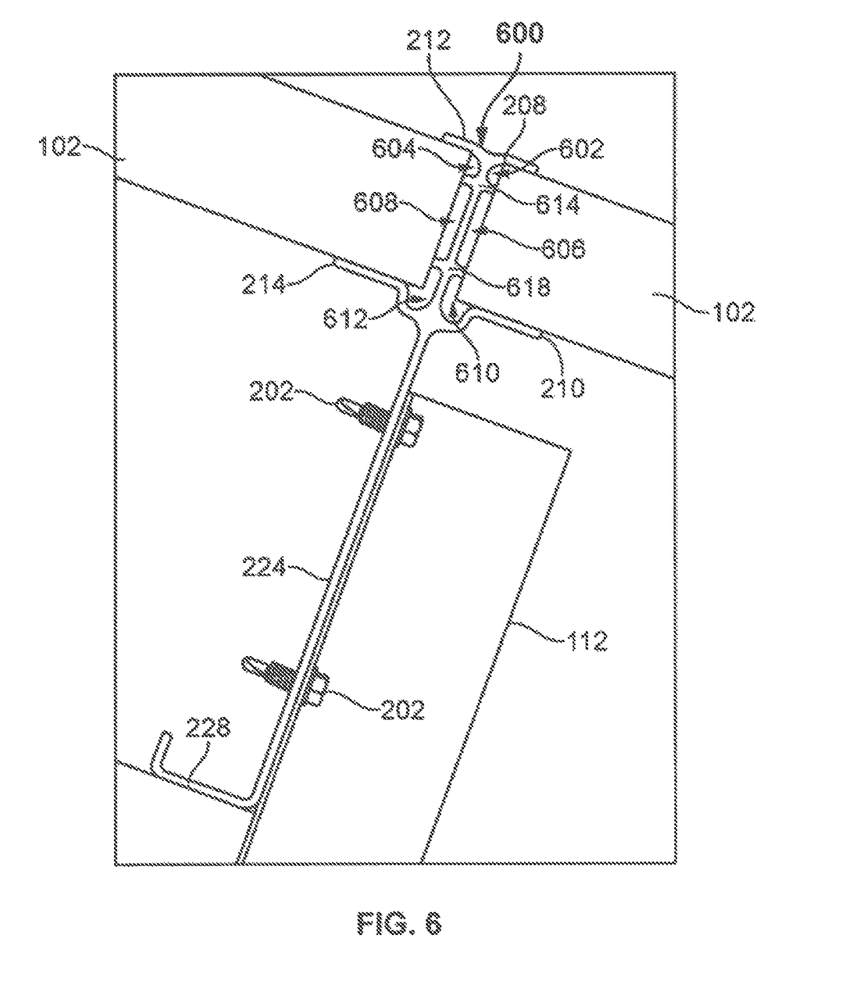
FIG. 6 illustrates another enlarged view of the insertion rail according to another embodiment of the present invention.

Referring now to FIG. 6, another embodiment of an insertion rail is shown generally at 600. The insertion rail 600 is configured to receive and secure the solar panels 102. In one embodiment, the insertion rail 600 is configured to slidably receive and frictionally secure the solar panels 102 on both sides using a frictional fit or engagement.

In this embodiment, rather than there being upper and lower channels (204 and 206 of FIG. 2, respectively) at a top portion and a bottom portion of the rail 100, there are multiple internal channels 602, 604, 606, 608, 610 and 612. These channels are formed by top tabs 212 and 208, bottom tabs 210 and 214, and a plurality of inner tabs 614 and 618. The tabs provide advantageous thermal properties due to separation and the channels, and also provide additional mating surfaces with the panel 102.

Furthermore, the vertical leg 224, which is positioned on the other side of rail 100 relative to the mounting wall 222, has an approximately flat configuration and no inward angle positioned on a downward end of the vertical leg 224 before being integral with the cleat 228 as with the embodiment shown in FIG. 2. In one embodiment, the insertion rail 600 is further configured to provide one or more channels (210, 212, and 214) (602, 604, 606, 608, 610 and 612) on both sides at a guide rail portion, thereby providing aesthetic and thermal benefits.

Figure 7:
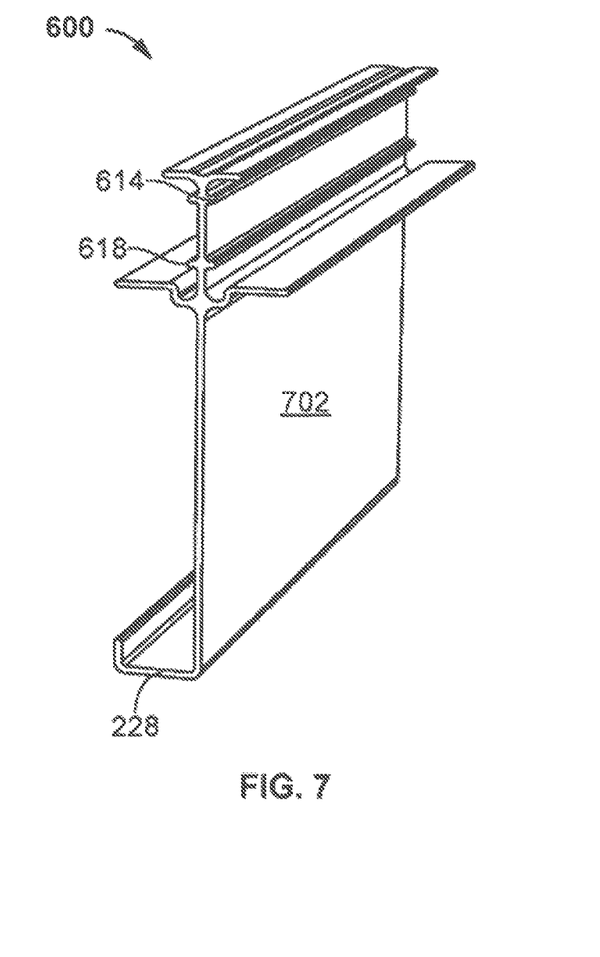
FIG. 7 illustrates a perspective view of the insertion rail according to another embodiment of the present invention.

Referring now to FIG. 7, a right perspective view of the insertion rail 600 of the present invention according to another embodiment is disclosed wherein the right side 702 of the rail is shown. In this view, the inner tabs 614 and 618 and protrusions (described in FIG. 8) can be clearly seen.

Figure 8:
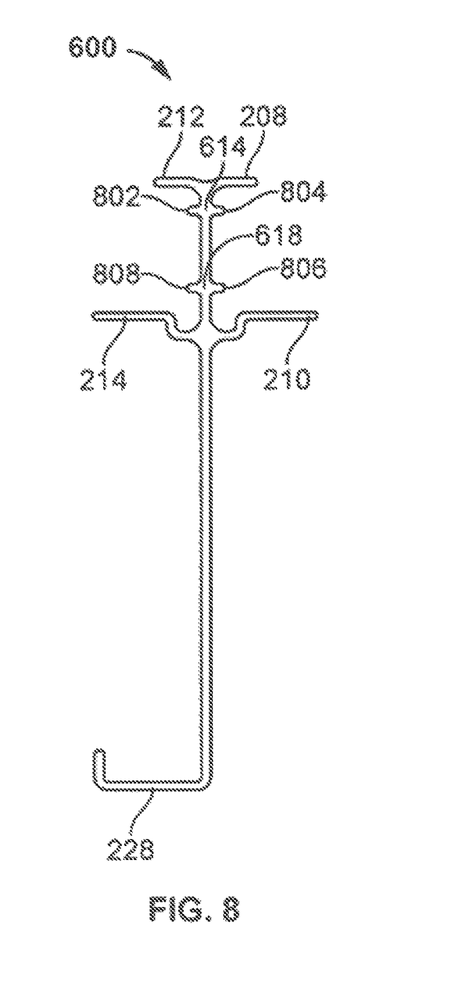
FIG. 8 illustrates another side view of the insertion rail according to another embodiment of the present invention.

Referring now to FIG. 8, a side view of the insertion rail 600 is disclosed. In one embodiment, the internal tabs 614 and 618 comprise protrusions 802, 804, 806, and 808. The protrusions are configured to ensure channels are formed between the spine and the solar panels when they are mounted to the rail.

In one embodiment, the insertion rail 600 is further configured to slidably receive and frictionally secure the solar panels 102 of thicknesses ranges from about, but not limited to, 35 to 40 mm. In one embodiment, the solar panels 102 could simply snap into pair of guide rails on both sides of the insertion rail 600 by a person or a technician.

The advantages of the present invention include, the insertion rails (100, 500 and 600) are configured to enable the person or technician to simply and quickly mount the solar panels 102 without using more fasteners, for example, bolts and nuts. The insertion rails (100, 500 and 600) are adaptable for mounting the solar panels 102 of various thicknesses ranges from about, but not limited to, 35 mm to 40 mm. The insertion rails (100, 500 and 600) are configured to slidably receive and frictionally secure the solar panels 102 on both sides via a frictional fit or frictional engagement, thereby eliminating approximately 600,000 bolts and nuts per 100 MW and saving work of 4000 man-hours per 100 MW. The insertion rails (100, 500 and 600) are a sturdy, compact, durable, simple, safe, versatile, reliable, and yet inexpensive and easy to manufacture and install.

Preferred embodiments of this invention are described herein, including the best mode known to the inventors for carrying out the invention. It should be understood that the illustrated embodiments are exemplary only and should not be taken as limiting the scope of the invention.

Although specific features of various embodiments of the invention may be shown in some drawings and not in others, this is for convenience only. In accordance with the principles of the invention, the feature(s) of one drawing may be combined with any or all of the features in any of the other drawings. The words "including," "comprising," "having," and "with" as used herein are to be interpreted broadly and comprehensively, and are not limited to any physical interconnection. Moreover, any embodiments disclosed herein are not to be interpreted as the only possible embodiments. Rather, modifications and other embodiments are intended to be included within the scope of the appended claims.

What is claimed is:

1. An insertion rail for a solar panel mounting system, the insertion rail comprising:
    a mounting wall configured for connection to the solar panel mounting system, wherein the mounting wall is positioned at a lower end of a first side of the insertion rail;
    a vertical leg coupled to the mounting wall at at least one location, wherein the vertical leg is positioned at a second side of the insertion rail;
    at least one mating section located at an upper end of the insertion rail, wherein the at least one mating section comprises a right mating section and a left mating section, wherein the right mating section comprises a pair of right upper and lower tabs, and the left mating section comprises a pair of left upper and lower tabs, wherein the pair of right upper and lower tabs and the pair of left upper and lower tabs are configured to receive and secure consecutive solar panels of an array of solar panels using an interference fit;
a top joint formed between the right upper tab and left upper tab;
a bottom joint formed between the right lower tab and left lower tab; and
a center spine integrated between the right mating section and left mating section, wherein the right mating section and the left mating section extend outwardly perpendicular from the center spine;
wherein the center spine comprises a planar wall that extends from the top joint to the bottom joint; and
wherein the insertion rail is integrally formed as one-piece.

2. The insertion rail of claim 1, wherein the insertion rail is configured to be secured to a horizontal supporting member of a frame of the solar panel mounting system using one or more fasteners.

3. The insertion rail of claim 1, further comprising:
an upper channel located at the upper end of the insertion rail, wherein the upper channel is formed at the top joint by a top U-shaped member that connects the right tab, left tab, and the center spine at the upper end; and
a lower channel located at the lower end of the insertion rail, wherein the lower channel is formed at the bottom joint by a bottom U-shaped member that connects the right tab, left tab, and the center spine at the lower end.

4. The insertion rail of claim 1, wherein the vertical leg comprises an inward angle portion positioned on a lower end of the vertical leg.

5. The insertion rail of claim 1, further comprising a cleat, wherein the cleat connects the mounting wall and the vertical leg at a bottom portion of the insertion rail, and wherein the cleat is configured to connect or mate with the frame of the solar panel mounting system.

6. The insertion rail of claim 5, further comprising an upwardly bent hook extending from the cleat.

7. The insertion rail of claim 1, further comprising a center rib, wherein the center rib connects the mounting wall and the vertical leg at a middle portion of the insertion rail, and wherein the center rib provides additional structural support.

8. The insertion rail of claim 1, wherein the upper tabs and lower tabs comprise respective mating surfaces that form a right guide rail and a left guide rail, respectively.

9. The insertion rail of claim 1, wherein the tabs are formed of a flexible material and are configured to receive solar panels of varying thickness.

10. The insertion rail of claim 1, further comprising:
at least one inner tab, each of the at least one inner tab comprising protrusions extending perpendicularly from the center spine; and
a plurality of internal channels formed by the protrusions, the center spine, and the solar panels when the solar panels are abutted against the protrusions upon the securement of the solar panels.

11. A solar panel mounting system comprising:
a frame configured to support at least one solar panel;
a plurality of mounting brackets connected to the frame;
a plurality of support brackets connected to the frame; and
an insertion rail comprising:
a mounting wall configured for connection to the solar panel mounting system, wherein the mounting wall is positioned at a lower end of a first side of the insertion rail;
a vertical leg coupled to the mounting wall at least one location, wherein the vertical leg is positioned at a second side of the insertion rail;
at least one mating section located at an upper end of the insertion rail, wherein the at least one mating section comprises a right mating section and a left mating section, wherein the right mating section comprises a pair of right upper and lower tabs, and the left mating section comprises a pair of left upper and lower tabs, wherein the pair of right upper and lower tabs and the pair of left upper and lower tabs are configured to receive and secure consecutive solar panels of an array of solar panels using an interference fit;
a top joint formed between the right upper tab and left upper tab;
a bottom joint formed between the right lower tab and left lower tab; and
a center spine integrated between the right mating section and left mating section, wherein the right mating section and the left mating section extend outwardly perpendicular from the center spine;
wherein the center spine comprises a planar wall that extends from the top joint to the bottom joint; and
wherein the insertion rail is integrally formed as one-piece.

12. The system of claim 11, wherein the insertion rail is configured to be secured to a horizontal supporting member of the frame of the solar panel mounting system using one or more fasteners.

13. The system of claim 11, wherein the insertion rail further comprises:
an upper channel located at the upper end of the insertion rail, wherein the upper channel is formed at the top joint by a top U-shaped member that connects the right tab, left tab, and the center spine at the upper end; and
a lower channel located at the lower end of the insertion rail, wherein the lower channel is formed at the bottom joint by a bottom U-shaped member that connects the right tab, left tab, and the center spine at the lower end.

14. The system of claim 11, wherein the insertion rail further comprises a cleat, wherein the cleat connects the mounting wall and the vertical leg at a bottom portion of the insertion rail, and wherein the cleat is configured to connect or mate with the frame of the solar panel mounting system.

15. The system of claim 14, wherein the insertion rail further comprises an upwardly bent hook extending from the cleat.

16. The system of claim 11, wherein the insertion rail further comprises:
at least one inner tab, each of the at least one inner tab comprising protrusions extending perpendicularly from the center spine; and
a plurality of internal channels formed by the protrusions, the center spine, and the solar panels when the solar panels are abutted against the protrusions upon the securement of the solar panels.

* * * * *